(12) United States Patent
Lefebvre et al.

(10) Patent No.: US 7,568,843 B2
(45) Date of Patent: Aug. 4, 2009

(54) OIL BEARING AND TUBE ASSEMBLY CONCEPT

(75) Inventors: Guy Lefebvre, St-Bruno (CA); Eric Durocher, Vercheres (CA)

(73) Assignee: Pratt & Whitney Canada Corp., Longueil, Québec (CA)

( * ) Notice: Subject to any disclaimer, the term of this patent is extended or adjusted under 35 U.S.C. 154(b) by 461 days.

(21) Appl. No.: 11/509,587

(22) Filed: Aug. 25, 2006

(65) Prior Publication Data

US 2008/0050061 A1 Feb. 28, 2008

(51) Int. Cl.
*F16C 33/66* (2006.01)
(52) U.S. Cl. .................. 384/462; 184/6.11; 384/473
(58) Field of Classification Search .......... 384/462, 384/473, 474, 471; 184/6.11
See application file for complete search history.

(56) References Cited

U.S. PATENT DOCUMENTS

| 3,637,270 | A | * | 1/1972 | Johnson .................. 384/471 |
|---|---|---|---|---|
| 3,744,861 | A | * | 7/1973 | Bouiller et al. ............ 384/471 |
| 4,265,334 | A | | 5/1981 | Benhase, Jr. |
| 4,339,160 | A | * | 7/1982 | McHugh .................... 384/130 |
| 4,645,415 | A | * | 2/1987 | Hovan et al. ............... 415/115 |
| 4,856,273 | A | * | 8/1989 | Murray ..................... 184/6.11 |
| 5,433,584 | A | | 7/1995 | Amin et al. |
| 5,526,640 | A | | 6/1996 | Brooks et al. |
| 6,102,577 | A | | 8/2000 | Tremaine |
| 6,409,464 | B1 | | 6/2002 | Fisher et al. |
| 6,682,222 | B2 | | 1/2004 | Fisher |
| 7,055,303 | B2 | | 6/2006 | Macfarlane et al. |
| 7,410,302 | B2 | * | 8/2008 | Pettersson et al. .......... 384/471 |

\* cited by examiner

*Primary Examiner*—Thomas R Hannon
(74) *Attorney, Agent, or Firm*—Ogilvy Renault

(57) ABSTRACT

A bearing housing for a gas turbine engine comprises: a bearing housing body having a bearing cavity defined therein and at least one of a built-in lubricant nozzle and a built-in scavenge hole defined therein and in fluid communication with the bearing cavity.

14 Claims, 3 Drawing Sheets

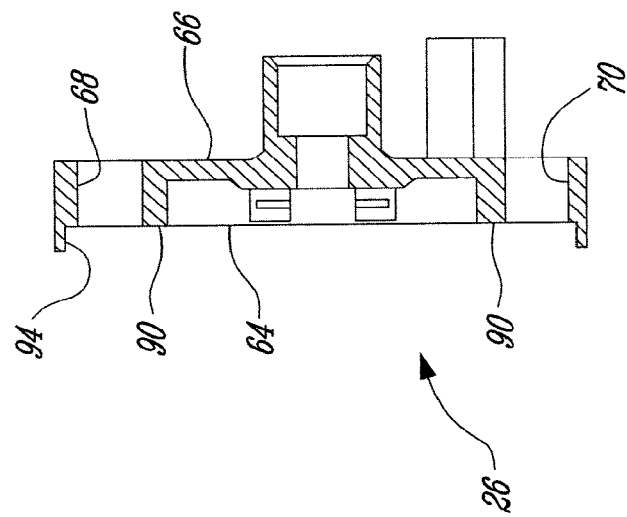
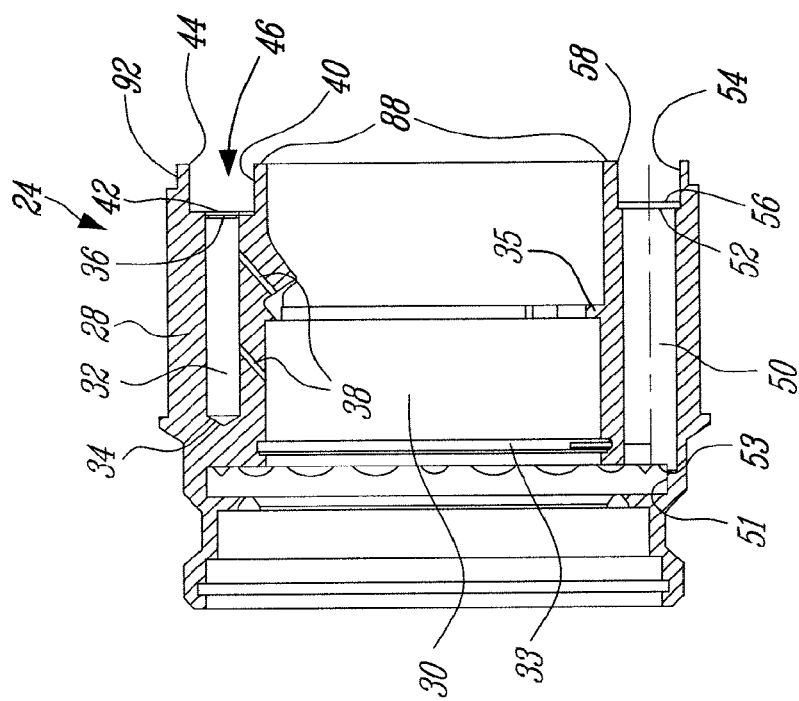

OIL BEARING AND TUBE ASSEMBLY CONCEPT

TECHNICAL FIELD

The invention relates generally to gas turbine engine bearing housings and, more particularly, to an improved design for bearing housings.

BACKGROUND OF THE ART

A gas turbine engine generally includes an engine structure in which a shaft is mounted on oil lubricated bearings housed in a bearing housing or bearing gallery for rotation about an engine axis. The bearing housing serves several purposes: it supports the bearing assemblies; it provides a closed environment for lubricating oil, etc. The bearing lubrication circuit typically includes the bearing housing sealed with running seals to the shaft, a lubricating oil supply line fixed to the bearing housing, and an oil scavenge line. The lubricating oil supply line supplies the oil to the bearing housing through several oil injection openings or nozzles that spray relatively cool oil on the bearings in selected areas. The oil is then collected in an oil bath chamber, or scavenge hole, and is evacuated through the oil scavenge line.

Manufacturing problems often occur when assembling the bearing housing and mounting the oil transfer tubes to the bearing housing. Also, the assembly of the housing parts and the oil tubes has to be done separately in several steps, which is time consuming and costly. Accordingly, there is a need to provide an improved bearing housing.

SUMMARY OF THE INVENTION

It is therefore an object of this invention to provide a bearing housing design which reduces the manufacturing problems.

In one aspect, the present invention provides a bearing housing for a gas turbine engine. The bearing housing comprises: a bearing housing body having a bearing cavity defined therein, a cover closing one end of said bearing cavity, at least one of a built-in lubricant nozzle and a built-in scavenge hole defined in the body and in fluid communication with the bearing cavity, and at least one oil tube connected to said at least one of said built-in lubricant nozzle and said built-in scavenge hole, said bearing housing body, said cover and said at least one oil tube being connected all together by a same joint.

In a second aspect, the present invention provides a bearing housing comprising a bearing housing body defining a bearing cavity, a cover mounted to a first end of the bearing housing body for substantially closing a first end of the bearing cavity, inlet and outlet lubricant passages integrally formed in said bearing housing body and extending from said end face, the inlet and outlet passages communicating with said bearing cavity and being aligned in registry with corresponding openings defined in said cover, an oil supply tube having a distal end portion extending through a first one of said openings and into said inlet passage, and an oil scavenge tube having a distal end portion extending through a second one of said openings and into said outlet passage.

In a third aspect, the present invention provides a method for manufacturing a bearing housing. The method comprises: machining a bearing housing body with a channel defined therein; machining a bearing housing cover with a channel extending therethrough; juxtaposing the bearing housing body and the bearing housing cover with the channel defined in the bearing housing cover in register and in fluid communication with the channel defined in the bearing housing body to define a continuously extending channel; inserting a lubricant tube in the continuously extending channel; and brazing the lubricant tube into both the channel defined in the bearing housing body and the channel defined in the bearing housing cover.

In a fourth aspect, the present invention provides a bearing housing which comprises: a bearing housing body having a channel defined therein; a bearing housing cover having a channel extending therethrough, the bearing housing cover being juxtaposable to the bearing housing body with the channel in register with the channel defined in the bearing housing body to define a continuously extending channel; and a lubricant tube insertable in the continuously extending channel and brazable to both the channel defined in bearing housing body and the channel defined in bearing housing cover.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 3 is a cross-sectional view of the bearing housing body shown in FIG. 2; and FIG. 4 is a cross-sectional view of the bearing housing cover shown in FIG. 2.

DETAILED DESCRIPTION OF THE PREFERRED EMBODIMENTS

Figure 1:
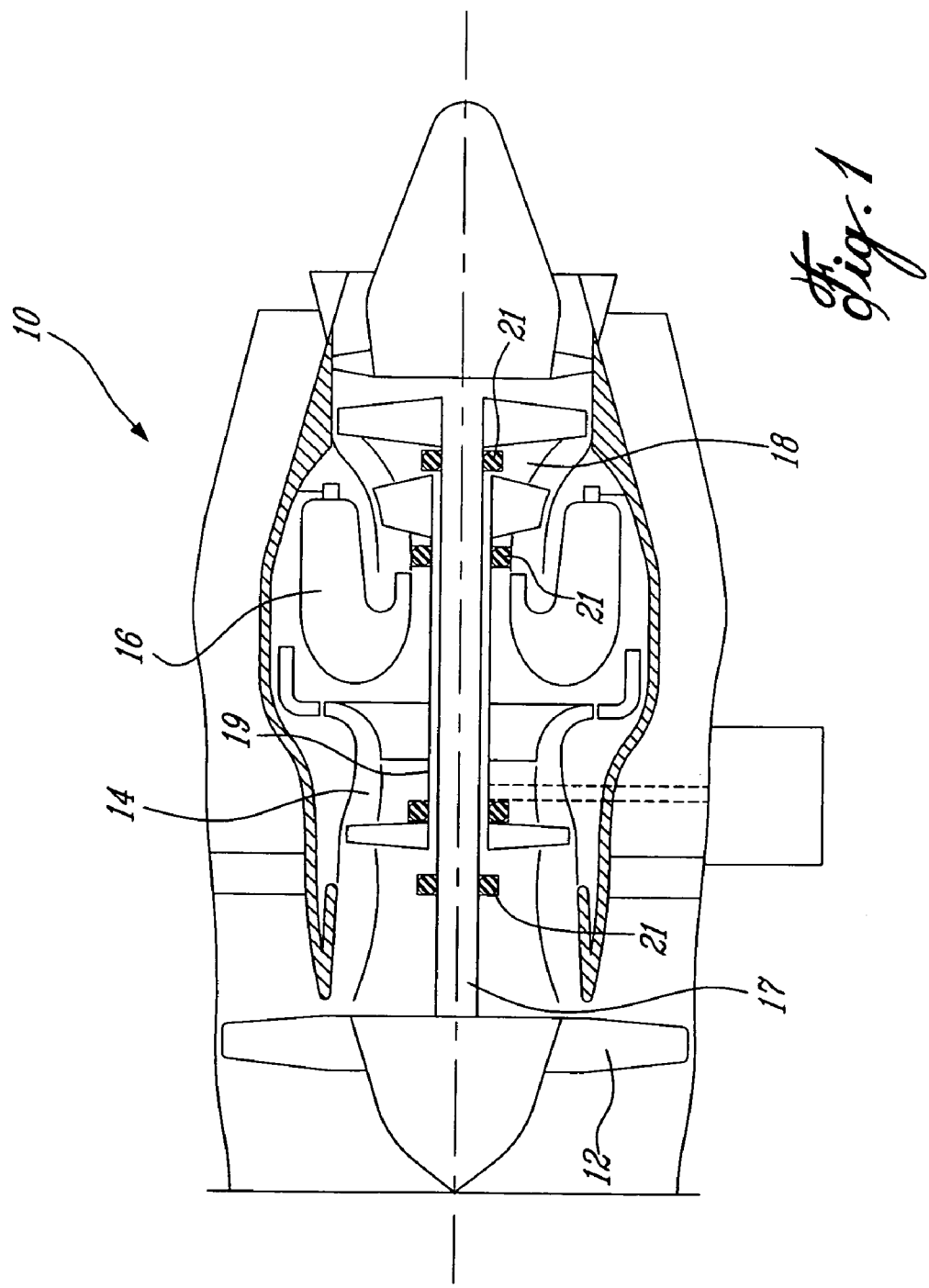
FIG. 1 is a schematic side view of a gas turbine engine, showing an example of a gas turbine engine including bearing housings supporting a central shaft.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

The engine has a low pressure shaft 17 and a high pressure hollow shaft 19 concentrically mounted about the low pressure shaft 17. Shafts 17 and 19 are supported by a plurality of bearing assemblies 21.

Figure 2:
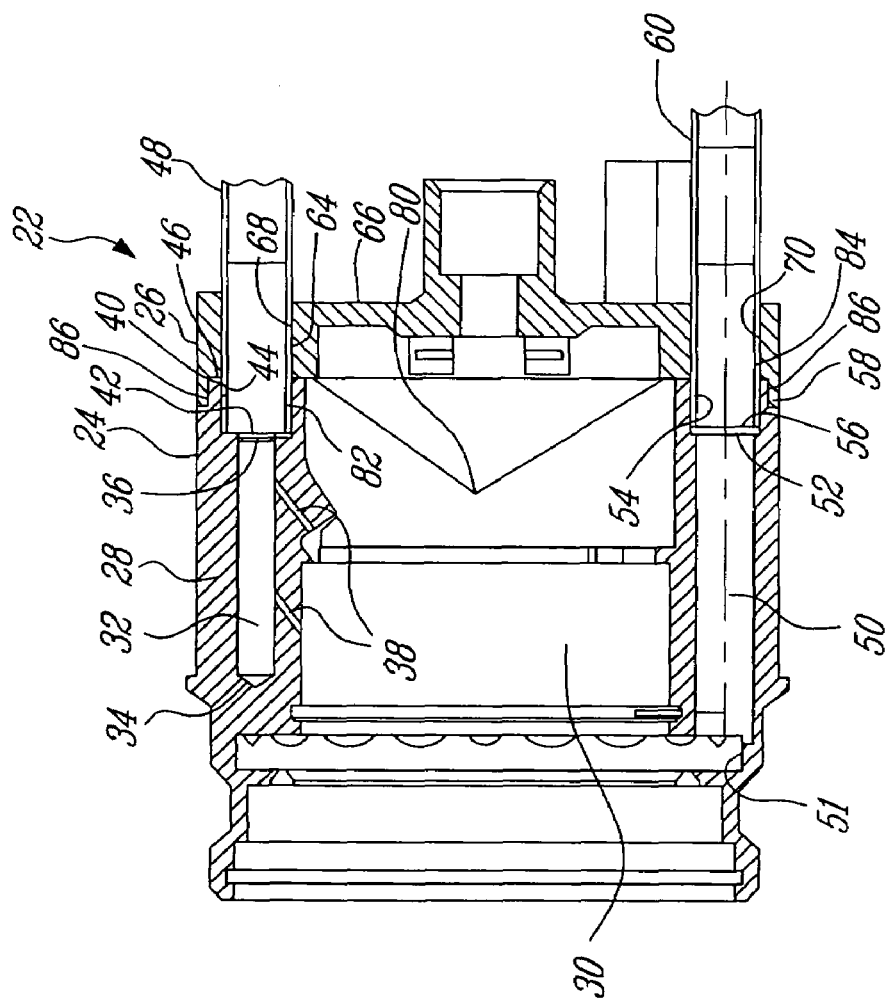
FIG. 2 is a cross-sectional view of a bearing housing in accordance with an embodiment of the present invention, with a bearing housing body and a bearing housing cover juxtaposed to one another.

FIG. 2 shows a bearing housing 22 of one of the bearing assemblies 21. The bearing housing 22 includes two components, each component being of unitary construction: a bearing housing body 24 and a bearing housing cover 26 mounted at one end of the bearing housing body 24. The bearing housing body and cover 24, 26 are machined separately from solid blocks of material.

Referring to FIG. 3, it can be seen that the bearing housing body 24 has a circumferentially extending peripheral wall 28 defining a central open ended bearing cavity 30. The peripheral wall 28 includes built-in oil nozzles 32 (only one is shown) having a longitudinal channel with a closed pyramidal end 34, a port 36 at an opposed end of the channel and a pair of angular ejection channels 38. The main longitudinal channel portion of the nozzle 32 is preferably machined through end face 46 of the wall 28 against which cover 26 is mounted. The injection channels 38 are in fluid flow communication with the central bearing cavity 30 for discharging lubricant against the bearing rollers (not shown) received in a bearing track mounted between circumferential groove 33 and circumferential inner shoulder 35. A c-clip (not shown) or the like is mounted in groove 33 to prevent axial withdrawal of the bearing elements from the housing 22.

An oil supply line receiving cavity 40 is also defined into the end face 46 of peripheral wall 28. The oil supply cavity 40 is in registry with the oil nozzle 32 and in communication therewith. The oil supply cavity 40 has a first port 42 contiguous to the port 36 of the oil nozzle 32. The contiguous ports 36, 42 are in fluid communication. The oil supply line receiving cavity 40 has a second port 44, opposite to the first port 42, which opens on the end face 46 of the peripheral wall 28. The end face 46 of the peripheral wall 28 is annular-shaped.

As shown in FIG. 2, the internal diameter of the oil supply cavity 40 is slightly greater than the internal diameter of the oil nozzle 32 and is adapted to receive therein an oil supply tube 48, as will be described in more details below.

Referring back to FIG. 3, it will be seen that the peripheral wall 28 of the bearing housing body 24 also has an integral or built-in scavenge hole 50 which is in fluid communication with the central bearing cavity 30 via a circumferentially extending oil gathering groove 51. The scavenge hole 50 has an inlet port 53 opening on the oil gathering groove 51. The scavenge hole 50 has an outlet port 52, proximate to the end face 46, in fluid flow communication with an annular oil scavenge pipe cavity 54 also defined into the end face 46 of the peripheral wall 28. The oil scavenge pipe cavity 54 has a first port 56 contiguous to the port 52 of the scavenge hole 50. The contiguous ports 52, 56 are in fluid communication. The oil scavenge cavity 54 has a second port 58, opposite to the first port 56, which opens on the end face 46 of the peripheral wall 28.

As for the oil supply line cavity 40, the internal diameter of the oil scavenge cavity 54 is slightly greater than the internal diameter of the scavenge hole 50 and is designed to receive therein an oil scavenge pipe 60 (FIG. 2), as will be described in more details below.

The bearing housing body 24 is machined as a single piece with the integrated oil nozzles 32, injection channels 38, oil supply cavity 40, scavenge hole 50, and oil scavenge cavity 54 therein.

As shown in FIG. 2, the oil nozzle 32, the oil supply cavity 40, the scavenge hole 50, and oil scavenge cavity 54 extend longitudinally in the bearing housing body 24.

As for housing body 24, the bearing housing cover 26 is machined from a single block of material. As shown in FIG. 4, the cover 26 has an inner wall 64 and an opposed outer wall 66. The inner wall 64 is designed to be juxtaposed to the end face 46 of the bearing housing body 24. Oil supply and oil scavenge tube receiving openings 68 and 70 extend thickness wise through the cover 26. The diameter of openings 68 and 70 corresponds substantially to the diameter of the oil supply cavity 40 and the oil scavenge cavity 54, respectively. As shown in FIG. 2, the openings 68 and 70 are respectively in registry with annular cavities 40 and 54 when the cover is mounted to end face 46 of the housing body 24. This configuration is advantageous in that no transfer tubes are needed to transfer oil from the rear cover 26 to the bearing housing body 24. Also, it provides for a long internal brazing joint along the oil tubes 48 and 60, thereby ensuring the integrity of the tube connection over time. A short or exposed brazed/welded joint between the oil tubes and the bearing housing could result in cracks and failure during engine operation.

The bearing housing cover 26 is bonded, such as by brazing, to the bearing housing body 24. The cover 26 and housing body 24 are brazed together at a first interface 80 thereof formed by body annular end surface 88 (FIG. 3) and cover annular inner surface 90 (FIG. 4) about the central bearing cavity 30. The cover 26 and the housing body 24 are also brazed together along an annular interface 86 formed by a radially outer facing shoulder 92 (FIG. 3) provided at the rear end of the housing body 24 and a corresponding radially inner facing shoulder 94 (FIG. 4) provided on the inner facing side of the cover 26. The interface 86 provides for an additional brazing application all around the oil nozzle and oil scavenge passages. The above brazing applications ensure a perfect sealing between the cover 26 and the housing body 24.

The oil supply tube 48 is secured to the bearing housing 22 by first inserting an end section 82 of the oil supply tube 48 through cover opening 68 and into the oil supply tube cavity 40 against port 42 thereof and by brazing the end section 82 simultaneously to both the cover 26 and the housing body 24. Likewise, the oil scavenge pipe 60 is secured to the bearing housing 22 by inserting an end section 84 of the pipe 60 through opening 70 and fully into cavity 54 and by brazing the end section 84 simultaneously to both the cover 26 and the housing body 24. Shim stock can be used to braze the oil supply tube 48 and the scavenge pipe 60 to the cover 26 and the body housing 24. Shim stock is herein intended to means any sheet of brazing material that can be installed between two metallic pieces and that is adapted to be melt at a lower temperature of the two metallic pieces so as to joint them together. A brazing paste could also be used. This provides an effective sealing between the oil tubes 48, 60, the cover 26 and the housing body 24.

The above bearing housing and oil tube assembly design allows to assemble the oil tubes 48, 60, the rear cover 26 and the bearing housing body 24 all together in a single assembly sequence by mounting the parts to one another and joining them all at once by brazing. In this way, the tubes 48, 60, the housing body 24 and the rear cover are joined together in a single brazing step.

The oil supply tube 48 can be brazed at the distal end thereof into the cavity 40 and at a second location there along into opening 68 near the inlet end thereof on the outer side 66 of the cover 26. The braze connection between the cover 26 and the tube 48 can, thus, be readily visually inspected from outside the bearing housing 22. This provides a significant advantage over prior art technique where the braze connection between the oil supply tube and the oil nozzle is located inside the bearing cavity within the bearing housing.

Likewise, the scavenge pipe 60 is preferably brazed at the distal end thereof into cavity 54 and at a second location along the length thereof into opening 70 near the inlet end thereof on the outer side of the cover 26. Again, this provides for visual inspection of the braze connection from outside of the bearing housing 22. It is understood that the braze joint can be continuous all along the distal end portion of the oil tubes.

The oil supply tube 48 and the oil scavenge pipe 60 are preferably bonded along all the circumference thereof to the inner wall of the oil supply cavity 40 and opening 68 and the oil scavenge cavity 54 and opening 70, respectively.

It is appreciated that the oil supply tube 48 and the oil scavenge pipe 60 could be bonded into the oil supply cavity 40 and opening 68 and the oil scavenge cavity 54 and opening 70 along the entire length of these cavities and openings 40, 54, 68, 70. To facilitate bonding of the tube 48 and the pipe 60 into cavities 40, 54, these cavities are of relatively short length. However, they are sufficiently long to ensure an adequate bonding between cavities 40, 54 and tubes 48, 60 and prevent oil leakage.

In use, oil is supplied from the oil supply tube 48 into the oil nozzles 32 where it is discharged in to the bearing cavity 30 through the injection channels 38. Injected oil is recovered into groove 51 before being withdrawn from the bearing cavity 30 via scavenge hole 50. The oil is then directed to various oil processing unit via the scavenge pipe 60.

Having built-in or integrated oil nozzles 32 and scavenge holes 50 eliminate the need for internal brazing inspection issues which are necessary when adding additional components, i.e. oil nozzles 32 or scavenge holes 50, to the bearing housing body 24.

The oil tube and the scavenge pipe, as mentioned above, are bonded to both the bearing housing body 24 and the bearing housing cover 26. The resulting bearing housing is easy to manufacture since it is made of only two components, i.e. the bearing housing body 24 and the bearing housing cover 26. The resulting installation of the oil supply tube 48 and the scavenge pipe 60 is relatively easy since it only goes through the bearing housing cover 26 which has a relatively small thickness and a section of the bearing housing body 24. There is no need for connecting the oil supply or scavenge tubes to a corresponding connecting part located within the bearing cavity.

The above description is meant to be exemplary only, and one skilled in the art will recognize that changes may be made to the embodiments described without department from the scope of the invention disclosed. For example, it is appreciated that bearing housing can be lubricated by any other appropriate lubricants. The term "oil" being herein loosely used to refer to any suitable bearing lubricant. Also it is understood that the oil tubes could be directly received in the bearing housing and not through the cover as herein described. It is also understood that the tube receiving cavities 40 and 54 could constitute an undistinguishable part of the oil nozzle 32 and the scavenge hole 50. Still other modifications which fall within the scope of the present invention will be apparent to those skilled in the art, in light of a review of this disclosure, and such modifications are intended to fall within the appended claims.

What is claimed is:

1. A bearing housing for a gas turbine engine comprising: a bearing housing body having a bearing cavity defined therein, a cover closing one end of said bearing cavity, at least one of a built-in lubricant nozzle and a built-in scavenge hole defined in the body and in fluid communication with the bearing cavity, and at least one oil tube connected to said at least one of said built-in lubricant nozzle and said built-in scavenge hole, said bearing housing body, said cover and said at least one oil tube being connected all together by a same joint.

2. The bearing housing as defined in claim 1, wherein the cover has an opening extending therethrough in alignment with a tube receiving cavity defined in the bearing housing body, said at least one oil tube having a distal end portion received in said opening and said tube receiving cavity, and wherein said distal end portion is bonded in both said opening and said tube receiving cavity to form said joint.

3. The bearing housing as defined in claim 2, wherein the at least one oil tube is brazed to both the bearing housing body and the bearing housing cover.

4. The bearing housing as defined in claim 1, wherein said bearing housing body has an axially extending peripheral wall surrounding said bearing cavity, said peripheral wall having a first end against which the cover is mounted, a first tube receiving cavity is integrally defined in said first end in register with a first opening defined in the cover for receiving a first one of said at least one oil tube, said first tube receiving cavity being in fluid flow communication with the built-in lubricant nozzle provided in the bearing housing body, and wherein a second tube receiving cavity is defined in said first end in register with a second opening extending through the cover for receiving a second oil tube, said second tube receiving cavity being in fluid flow communication with the built-in scavenge hole provided in the bearing housing body, said joint securing said bearing housing body, said cover, and said first and second oil tubes all together via a braze connection of said first oil tube in said first tube receiving cavity and said first opening and said second oil tube in said second tube receiving cavity and said second opening.

5. A bearing housing comprising a bearing housing body defining a bearing cavity, a cover mounted to a first end of the bearing housing body for substantially closing a first end of the bearing cavity, inlet and outlet lubricant passages integrally formed in said bearing housing body and extending from said end face, the inlet and outlet passages communicating with said bearing cavity and being aligned in registry with corresponding openings defined in said cover, an oil supply tube having a distal end portion extending through a first one of said openings and into said inlet passage, and an oil scavenge tube having a distal end portion extending through a second one of said openings and into said outlet passage.

6. The bearing housing defined in claim 5, wherein said oil supply tube and said oil scavenge tube are brazed to both said cover and said bearing housing body.

7. The bearing housing defined in claim 6, wherein the bearing housing body and the cover are also brazed together at a first annular interface defined by a radially inner facing shoulder and a radially outer facing shoulder, and at a second interface perpendicular to a central axis of the housing body.

8. A method for manufacturing a bearing housing, the method comprising:
   machining a bearing housing body with a channel defined therein;
   machining a bearing housing cover with a channel extending therethrough;
   juxtaposing the bearing housing body and the bearing housing cover with the channel defined in the bearing housing cover in register and in fluid communication with the channel defined in the bearing housing body to define a continuously extending channel;
   inserting a lubricant tube in the continuously extending channel; and
   bonding the lubricant tube into both the channel defined in the bearing housing body and the channel defined in the bearing housing cover, thereby assembling the housing body, the cover and the lubricant tube all together in one assembly sequence.

9. A method as defined in claim 8, further comprising: machining an integrated bearing cavity and an integrated lubricant nozzle in the bearing housing body, the integrated lubricant nozzle being contiguous to the channel defined in the bearing housing body and in fluid communication with the bearing cavity.

10. A method as defined in claim 9, further comprising: machining an integrated lubricant hole in the bearing housing body, the integrated lubricant hole being in fluid communication with the bearing cavity.

11. A bearing housing comprising:
a bearing housing body having a channel defined therein;
a bearing housing cover having a channel extending therethrough, the bearing housing cover being juxtaposable to the bearing housing body with the channel in register with the channel defined in the bearing housing body to define a continuously extending channel; and
a lubricant tube insertable in the continuously extending channel and bondable to both the channel defined in bearing housing body and the channel defined in bearing housing cover.

12. The bearing housing as defined in claim 11, wherein the lubricant tube is brazable into both of the channel defined in bearing housing body and the channel defined in bearing housing cover.

13. The bearing housing as defined in claim 12, wherein the bearing housing body is single-piece machined and comprises a bearing cavity defined therein and a built-in lubricant nozzle in fluid communication with the bearing cavity and the channel extending in the bearing housing cover.

14. The bearing housing as defined in claim 13, wherein the bearing housing body comprises a built-in scavenge hole defined therein in fluid communication with the bearing cavity.

* * * * *